Nov. 12, 1963

W. A. FARRIS 3,110,476

THRUST LINKAGE SUPPORTED TABLES

Filed March 22, 1960

INVENTOR.
WILLIAM A. FARRIS
BY
Reynolds, Beach & Christensen
ATTORNEYS

INVENTOR.
WILLIAM A. FARRIS
BY
Reynolds, Beach & Christensen
ATTORNEYS

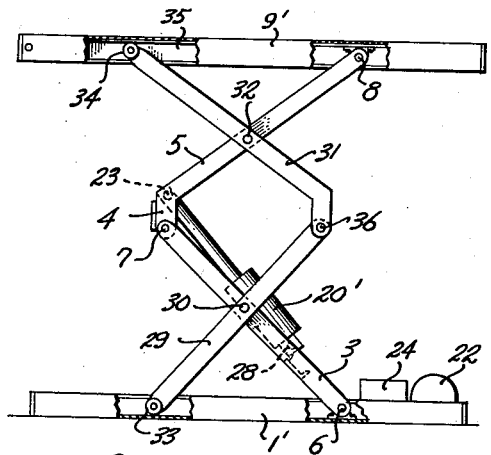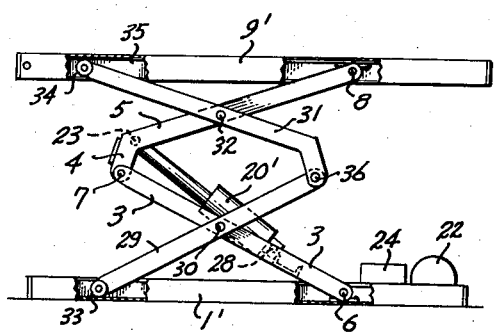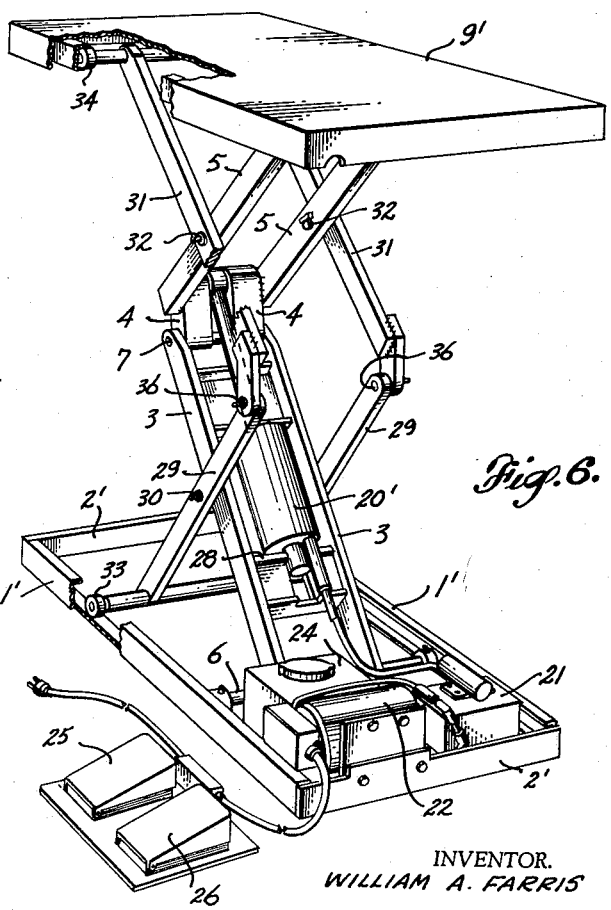

Nov. 12, 1963

W. A. FARRIS 3,110,476

THRUST LINKAGE SUPPORTED TABLES

Filed March 22, 1960

INVENTOR.
WILLIAM A. FARRIS
BY
Reynolds, Beach & Christensen
ATTORNEYS

Nov. 12, 1963     W. A. FARRIS     3,110,476
THRUST LINKAGE SUPPORTED TABLES
Filed March 22, 1960     5 Sheets-Sheet 5

INVENTOR.
WILLIAM A. FARRIS
BY
Reynolds, Beach & Christensen
ATTORNEYS

United States Patent Office 3,110,476
Patented Nov. 12, 1963

3,110,476
THRUST LINKAGE SUPPORTED TABLES
William A. Farris, Kirkland, Wash., assignor to American Manufacturing Company, Inc., Tacoma, Wash., a corporation of Washington
Filed Mar. 22, 1960, Ser. No. 16,711
3 Claims. (Cl. 254—122)

This invention relates to a table adjustable in height for the purpose of supporting at different heights loads of material to be handled in manufacturing processes such as for feeding to a machine or received from a machine.

The principal object of the present invention is to provide a table variable in height through a wide range from a very low position to quite a high position such as several feet in height. Such variation in height can be effected in small increments, yet a substantial adjustment in height can be accomplished quickly. Another feature is to provide mechanism which will lock automatically to hold the table at a particular elevation without the necessity of performing a special latching or holding operation.

To enable the table to be lowered to a low, collapsed elevation it is necessary to provide compact actuating mechanism, yet it is an object to utilize such mechanism which will support a substantial load. Moreover, such mechanism must be capable of supporting such a load with the table in any elevationally adjusted position.

A further object is to utilize mechanism which will be of simple and comparatively inexpensive construction, although being rugged and requiring a minimum of repair and upkeep.

The foregoing objects can be accomplished by utilizing the combination of dog-leg thrust linkage movable between a folded position with the links substantially parallel when the table is in its lower collapsed position and an extended position with the links approaching aligned position when the table is raised to its uppermost position in combination with leveling and stabilizing linkage to maintain the table top level in all elevationally adjusted positions. Such thrust linkage and stabilizing linkage can be interengaged between a base and the table top separately or such linkages can be combined so that certain links are common to both linkages.

FIGURE 6 is a top perspective view of a different type of table in an upper position with parts broken away, and FIGURE 7 is an end elevation view of the table in a similar position in which parts are also broken away.

FIGURE 8 is a side elevation of the alternate type of table in an upper position, FIGURE 9 is a similar view of the table in an intermediate position.

Figure 1:
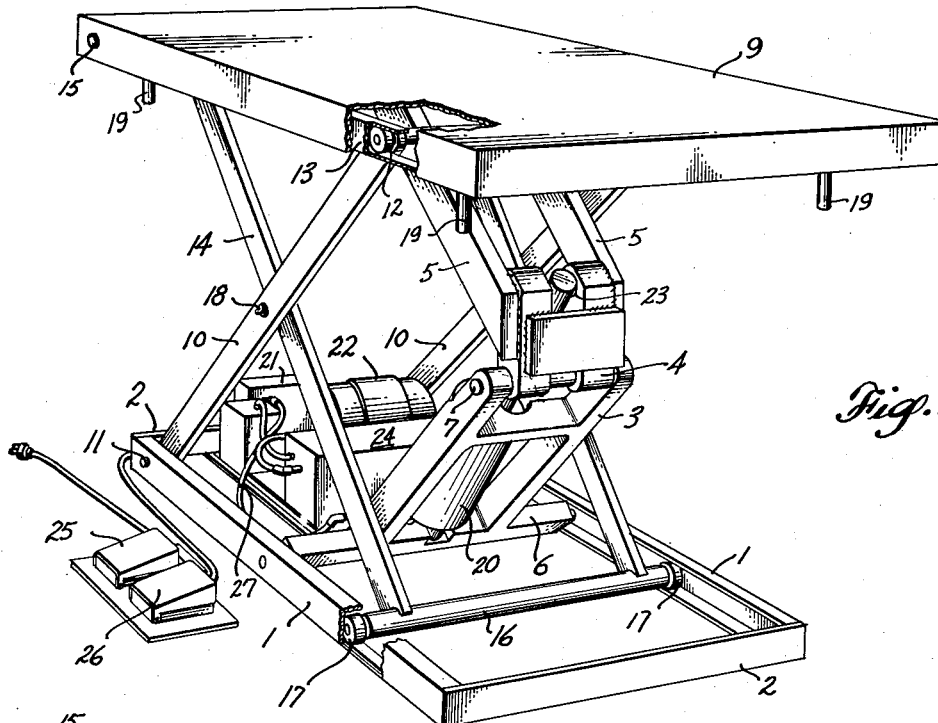
FIGURE 1 is a top perspective view of a table adjustable in height, with parts broken away.

Tables adjustable in height have been used for various industrial purposes but it has been difficult to provide simple and economical mechanism for varying the height of such tables which would enable the table to be lowered sufficiently and alternatively enable the table to be raised to a sufficient height for most uses. The structure of the present table satisfies these requirements by employing thrust linkage which will support the table and a load on it and which can be moved to alter the elevation of the table. Stabilizing linkage is provided to maintain the desired attitude of the table, preferably in a horizontal position parallel to the base, in all positions of adjustment. The stabilizing linkage also will control edgewise movement or prevent such movement as the table top is raised and lowered.

In FIGURES 1 to 5, inclusive, the table base is composed of a frame including opposite channels 1, the corresponding ends of which are connected by end bars 2 which may be secured together in any suitable fashion such as by welding. To the side channels is connected the dog-leg thrust linkage including a supporting link 3 and a bent supported link including a short leg 4 adjacent to the link 3 and a long leg 5. The lower end of the supporting link includes a pivoted bar 6 having its opposite ends journaled in the channel sides 1 of the base frame generally midway between their ends. The short leg 4 of the upper supported link fits between spaced elements forming the adjacent end of the link 3 and these link ends are pivotally connected together by the pivot rod 7. The end of the supported link leg 5 remote from the supporting link 3 is connected by pivot 8 to the table top 9 at a location generally midway between its opposite ends.

The links of the dog-leg thrust linkage preferably are in the form of leaf frames as shown in FIGURE 1 so that the linkage cannot twist readily. The thrust linkage itself therefore acts to resist rotation of the table top 9 relative to the base 1, 2 about a vertical axis, but such thrust linkage would not prevent the table top from rocking about the axis of pivot 8 or the linkage from rocking about the axis of the pivoted member 6. Also, such leaf type thrust linkage would not prevent the table top from moving endwise by conjoint swinging of the linkage relative to the base about the axis of pivot member 6 and relative to the table top about the axis of pivot member 8 even though the two leaves of the thrust linkage maintain a constant angular relationship relative to each other. Stabilizing linkage is provided to prevent such tilting and endwise shifting of the table top relative to the base.

The stabilizing linkage of the table shown in FIGURES 1 to 5, inclusive, is of the cross type including crossed links at opposite sides of the table which are pivoted to the base, to the table top and to each other. Links 10 have their lower ends pivotally connected by pivots 11 to the opposite base side members 1 and the upper ends of such links carry rollers 12 received in the channels 13 along opposite sides of the table top 9 which bear against the upper flanges of such channel members. Links 14 crossing links 10 have their upper ends pivotally connected by pivots 15 to the table top 9 and their lower ends are connected to opposite end portions of the cross bar 16 on the opposite ends of which are mounted rollers 17 received in the side channels 1. The central portions of the crossed links 10 and 14 are interconnected by pivots 18.

Because the triangles formed by the stabilizing links 10 and 14 and by the base and table top above and below the link connecting pivots 18, respectively, are similar and of isosceles type, the base angles of such triangles will always be equal and the table top 9 will be maintained in horizontal position parallel to the base in all vertically adjusted positions of the table top. Moreover, because the links 10 and 14 are positively connected to the table top and the base by the pivots 15 and 11, the table top cannot shift endwise relative to the base as the height of the table top is adjusted. On the other hand, because the links 10 and 14 are free to swing relatively about pivots 18, such stabilizing linkage will not resist elevational movement of the table top. Any tendency of the table top to tilt sidewise is resisted primarily by the resistance of the thrust linkage to twisting although the connection of the lower ends of links 14 by the spreader member 16 also opposes unequal relative swinging of the links 10 and 14 at opposite sides of the table.

Figure 2:
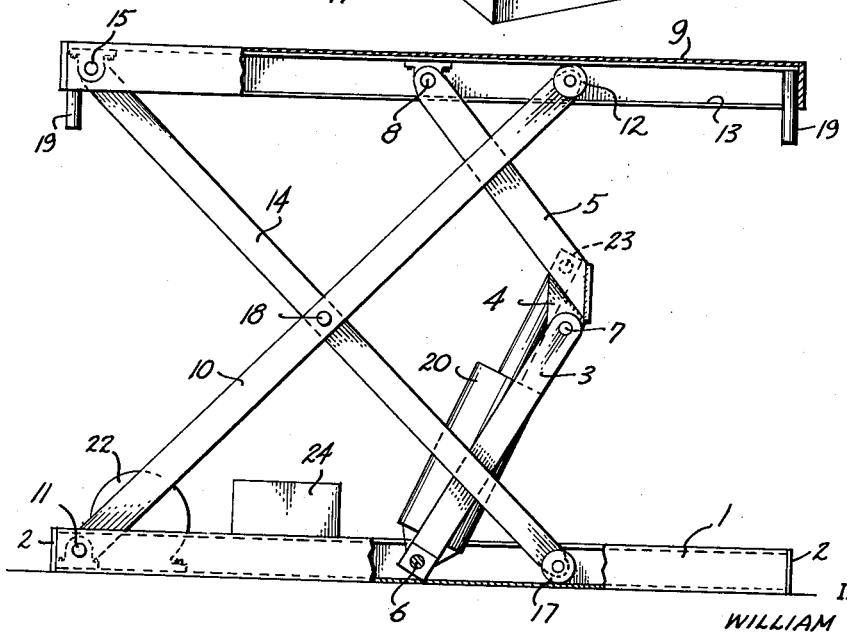
FIGURE 2 is a side elevation view of the table in an upper position of adjustment.

In FIGURE 2 the leaf links 3 and 4, 5 of the thrust linkage are shown in extended or relatively unfolded condition with the table top 9 in or near its uppermost position of adjustment. As the links of the thrust linkage move toward contracted or folded position through the relationship of FIGURE 3 to that of FIGURE 4, the table top 9 is lowered progressively into its lowermost position shown in FIGURE 4. In this position the thrust linkage can be relieved of all load by the table top being supported by short legs 19, one at each corner of the table top, the lower ends of which rest on the base channel sides 1. In this position the longer leg 5 of the upper thrust link is disposed substantially parallel to the lower link 3. Such relationship is made possible by providing the short leg 4 of the linkage which bridges between the lower end of the longer leg 5 of the upper link and the upper end of the lower link 3.

The relative swinging of the upper and lower links of the dog-leg thrust linkage is effected by applying a force to swing the links relatively about their connecting pivot 7. Such force can be produced by an actuator 20 which is variable in effective length and reacts between the links. Such actuator is shown as being of the fluid pressure piston-and-cylinder type which preferably includes self-contained pressure fluid supply mechanism such as a pump 21 driven by a motor 22. By utilizing a positive displacement pump such as a gear pump or a vane pump and liquid which is substantially incompressible, the actuator 20 can be employed both to effect relative swinging movement of the thrust links and to block such linkage against contracting or folding movement under the influence of the load on the table top 9.

Figure 4:
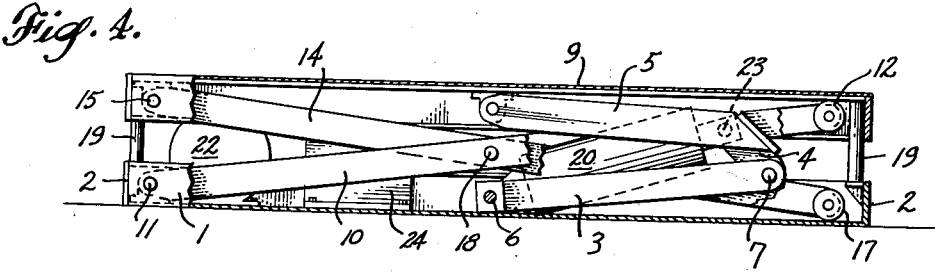
FIGURE 4 is a similar view with the table in its lowermost position, different parts being broken away in the several figures.
Figure 5:
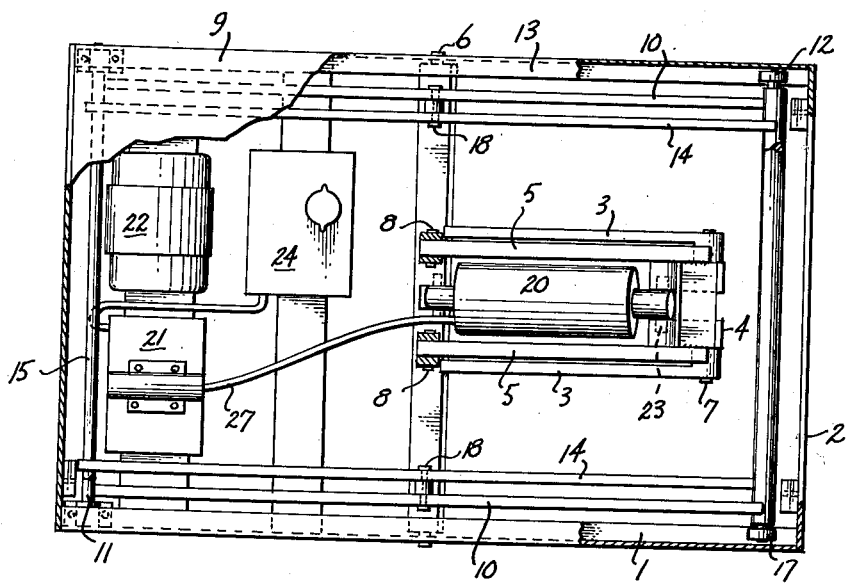
FIGURE 5 is a plan view of the table having parts broken away.
Figure 11:
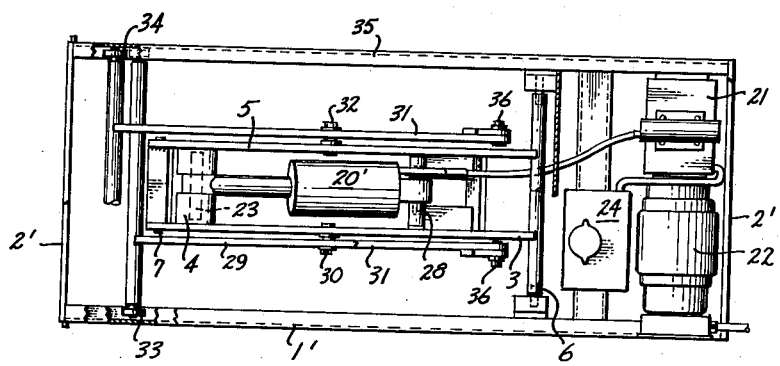
FIGURE 11 is a plan view of the table with the top and additional parts broken away.

In order to be effective for raising or holding at a desired height a loaded table top, it is necessary for the actuator 20 to have a reasonably good leverage on the thrust linkage particularly when the thrust linkage is near closed position. As shown in FIGURE 4, a substantial lever arm through which the force of the actuator 20 is applied is afforded by the short leg 4 of the upper link. The most effective leverage is obtained by pivoting the upper end of the actuator to the upper link approximately at the location of the bend in the upper link by a pivot 23. The length of the lever arm through which the force applied by the actuator 20 acts is always the perpendicular distance from pivot 7 to a line joining the pivots 6 and 23 at opposite ends of the actuator 20. The effective link-swinging moment of the actuator 20 therefore varies with the angle between the line of thrust of the actuator and a line joining the axes of the pivots 6 and 7 of link 3. The actuator thrust is most effective to swing link 5 when such angle is greatest because the lever arm is then longest.

For a given angular relative movement of the links of the thrust linkage, the elevational movement of the table top 9 is greatest when the table top is in its lowermost position. In progressively higher positions, the elevational movement of the table top is less for a given angular movement of the thrust links. Consequently, it is desirable that the lever arm through which the actuator acts in swinging the linkage be reasonably large when the table top is in its lowermost position of FIGURE 4. The lever arm need not be as great when the links are relatively unfolded as shown in FIGURES 1 and 2. Also, it is desirable to have the line of force of the actuator as nearly parallel as possible to the line joining the pivots of link 3 consistent with compactness of the mechanism when the linkage is in its folded position.

When it is stated, as it has been above, that the actuator 20 will react between the links of the linkage, it does not necessarily mean that the opposite ends of the actuator will be necessarily anchored respectively to the two links. While such mounting of the actuator would give the most direct action, it would be quite satisfactory for the lower end of the actuator 20 to be pivoted to the base at a location spaced from the pivot of the link to the base as is shown in the type of apparatus of FIGURES 13, 14 and 15. Since the actuator shown in FIGURES 1 to 4, inclusive, exerts a pushing force, the essential consideration is that the link 3 be capable of transmitting a force in tension.

The longer the short leg 4 of the upper link is made and the more nearly its angle with the longer leg 5 approaches a right angle, the greater will be the length of the lever arm on which the actuator 20 acts when the table is in its collapsed position if the link 3 and leg 5 are disposed substantially parallel in such condition of the table and the actuator is connected to a pivot 23 at the location of the bend. On the other hand, the shorter such leg 4 is made, the more compactly the thrust linkage can be folded so long as such leg 4 is long enough to enable the longer leg 5 to be folded in substantially parallel relationship with the link 3. As fluid under pressure is pumped by the pump 21 and motor 22 into the actuator, it will be extended from the position shown in FIGURE 4 toward the position of FIGURE 3 to move the thrust links toward unfolded relationship. As shown by a comparison of FIGURES 3 and 4, it will be seen that the actuator 20 swings with the linkage and substantially through the same angle relative to the base that the supporting link 3 swings as the linkage unfolds.

Figure 3:
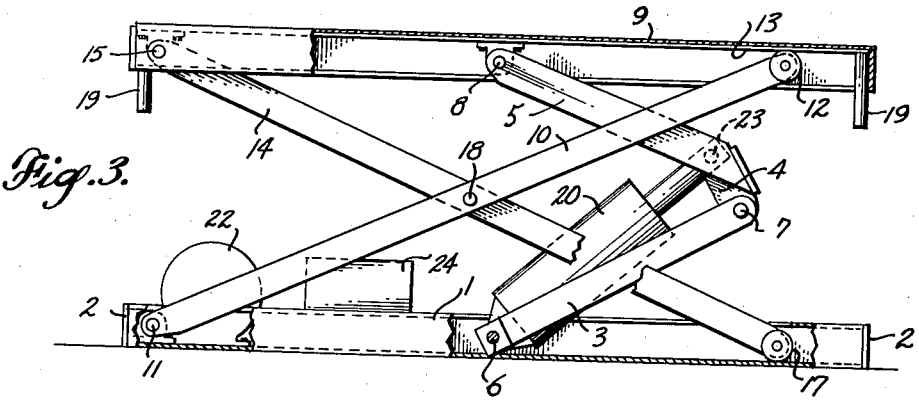
FIGURE 3 is a similar view with the table in an intermediate position of adjustment.

During the movement of the thrust linkage from the position of FIGURE 4 to the position of FIGURE 3, the lever arm through which the actuator 20 acts increases somewhat in length until the short leg 4 is perpendicular to a line joining the pivots 6 and 7 and as the thrust linkage unfolds farther toward the position of FIGURE 2, the length of the lever arm on which the actuator acts decreases in length. If the thrust linkage were unfolded beyond the position shown in FIGURE 2, the lever arm on which the force of the actuator 20 would act would decrease to an undesirably small length because of the angle of bend between the short leg 4 and the long leg 5 of the upper link. It is not desirable for these legs to be disposed at any smaller angle, although the length of the lever arm would be greater when the thrust linkage is in the fully collapsed position shown in FIGURE 4 because the lever arm would be undesirably short when the linkage is in the extended position of FIGURE 2. An important advantage of the thrust linkage utilized to raise the table top 9 is that the spacing between the base and the table top is determined by the relative movement of the remote ends of the two links as they swing between folded and unfolded positions. Comparatively little separation of the link ends would occur by opening the linkage farther from the position shown in FIGURE 2 to a position in which the links are aligned in coplanar relationship. By use of this mechanism, therefore, a comparatively great movement of the adjustable table top 9 can be effected by compact mechanism.

While the pivots 6 and 8 connecting the thrust linkage to the base and to the table top are shown as being located substantially midway between the opposite ends of the base and table top, it is not necessary that the pivots be placed at this location. In fact, it may be desirable to have such pivots offset slightly toward one end of the base and table top so as to exert a force on the top tending to tilt it lengthwise, which would maintain the stabilizing linkage under stress and thus eliminate play and consequent slight rocking of the table top which might be permitted because of some looseness in the pivots of the stabilizing linkage. The links 10 and 14 of the stabilizing linkage of the cross type shown in FIGURES 1 to 4, inclusive, should be sufficiently great so that when the table top 9 is in its uppermost position, the upper and lower angles between the links 10 and 14 will not be appreciably less than right angles. Otherwise the lower ends of these links and their upper ends may approach close enough so that the desired stability of the table top is difficult to maintain. It is obviously necessary, however, to make the side channels 1 of the base and the length of the table top at least as great as the length of the stabilizing linkage when the table is in the collapsed position shown in FIGURE 4 so as to accommodate such linkage between the table top and the base.

By providing a reservoir 24 for hydraulic liquid connected to the pump 21 and an elevating control 25 and lowering control 26 which conveniently may be of the foot pedal operated type as shown in FIGURE 1, the motor, pump and suitable control valves can be actuated to supply liquid under pressure to the actuator 20 for extending it to unfold the linkage 3, 4, 5 and raise the table top or to discharge liquid from the actuator to the reservoir for contraction of the actuator and lowering of the table top. If both control pedals 25 and 26 are released communication from the pump and reservoir to the line 27 connected to the actuator 20 will be cut off so that the amount of liquid in the actuator will be maintained constant. The actuator will, therefore, retain the thrust linkage in a constant position and thus maintain the table top 9 substantially stationary, irrespective of any variation in load on the table top.

If a shorter base and table were desired, a double-cross type of thrust and stabilizing linkage such as shown in FIGURES 6 to 12, inclusive, can be used. In this construction, the thrust linkage is the same as in the type of elevating table shown in FIGURES 1 to 5, inclusive, and the parts of this linkage have been numbered similarly. In this modification the opposite channel members 1' of the base are shorter than the members 1 in the elevating table shown in FIGURES 1 to 5. The end bars 2' can be of the same length as the end bars 2 of the table previously described, if desired. Also, the table top 9' shown in FIGURES 6 to 10 will be shorter than the table top 9 shown in FIGURES 1 to 5. In this instance, the actuator 20' is shown as having its lower end mounted on a pivot 28 on the lower link 3 of the thrust linkage at a location spaced a considerable distance from the pivot 6 of the link. The action of the actuator in moving the thrust linkage between the contracted or folded position shown in FIGURE 10 and the unfolded or expanded condition shown in FIGURE 8 is, however, similar to that described in connection with the mechanism shown in FIGURES 1 to 5, inclusive.

In the elevating table mechanism shown in FIGURES 6 to 12, the stabilizing linkage is integrated with the thrust linkage so that the links of the thrust linkage serve also as links of the stabilizing linkage. Thus the lower link 3 of the thrust linkage cooperates with a link 29 of equal length in each instance and these links are connected by pivots 30 to form a lower cross. Similarly, the upper link 4, 5 of the thrust linkage cooperates with the upper stabilizing link 31 which is of the same length as the link 4, 5 and is bent correspondingly but with its short end bent downward from the longer inclined leg of that link. The link 4, 5 and the link 31 at each side of the table are interconnected by pivots 32 to form an upper cross. The lower ends of links 29 carry rollers 33 received in the side channels 1' of the base and the upper ends of stabilizing links 31 carry rollers 34 received in the side channels 35 of the table top. It is, of course, immaterial whether the rollers are on the ends of links 29 and 31 or on the ends of links 3 and 4, 5.

Figure 10:
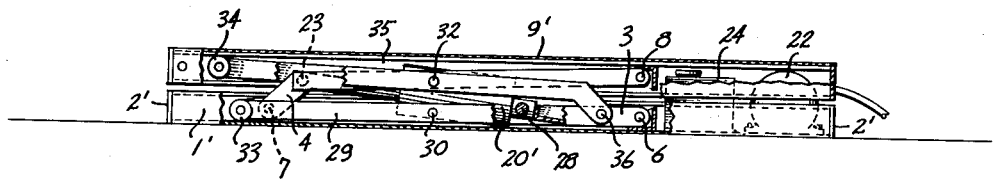
FIGURE 10 is a similar view of the table in its lowermost collapsed position with parts broken away in each instance.
Figure 12:
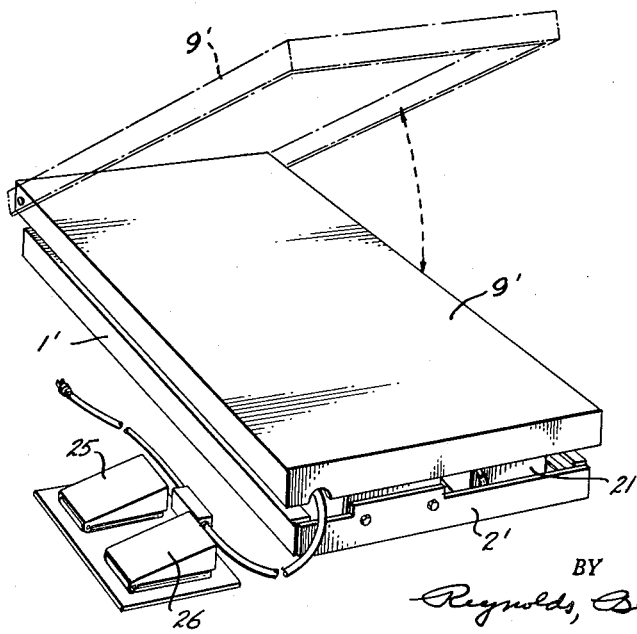
FIGURE 12 is a top perspective view of the alternate form of table shown in its lowermost collapsed position.

Upward swinging of the thrust link 3 relative to the base members 1' from the collapsed position shown in FIGURE 10 through the intermediate position of FIGURE 9 to the extended position of FIGURE 8 will cause the stabilizing links 29 to swing upward correspondingly because of the confinement of rollers 33 in the channels 1' and the link connections effected by the pivots 30. Such upward swinging of the links 3, 29 will move the upper ends of these links toward each other as illustrated by a comparison of FIGURES 9 and 8. Such approach movement of the upper ends of these links will cause the lower end of link 31 to be drawn toward pivots 7 because of the pivots 36 interconnecting the upper ends of links 29 and the lower ends of links 31. Since links 31 also are connected to the upper legs 5 of the thrust linkage by pivots 32, the links 31 will be swung upward relative to links 29 in the same manner that link 4, 5 is swung upward relative to link 3. Consequently, a line joining each of the pivots 8 and the axis of the roller 34 on the same side of the table will be maintained parallel to a line joining the lower pivot 6 and the axis of the roller 33 at the same side of the table. In this manner the top 9' will be maintained horizontal parallel to the table base frame.

The elevation of the table 9' can be adjusted and controlled by manipulation of foot controls 25 and 26 operating motor 22, pump 21 and the valve control mechanism in the same manner as described in connection with the mechanism shown in FIGURES 1 to 5, inclusive. In this table, the top 9' merely rests on the upper channels 35 and it can be lifted into the broken line position shown in FIGURE 12 to provide access to the linkage mechanism, the actuator and the pressure fluid supply and control mechanism.

Figure 13:
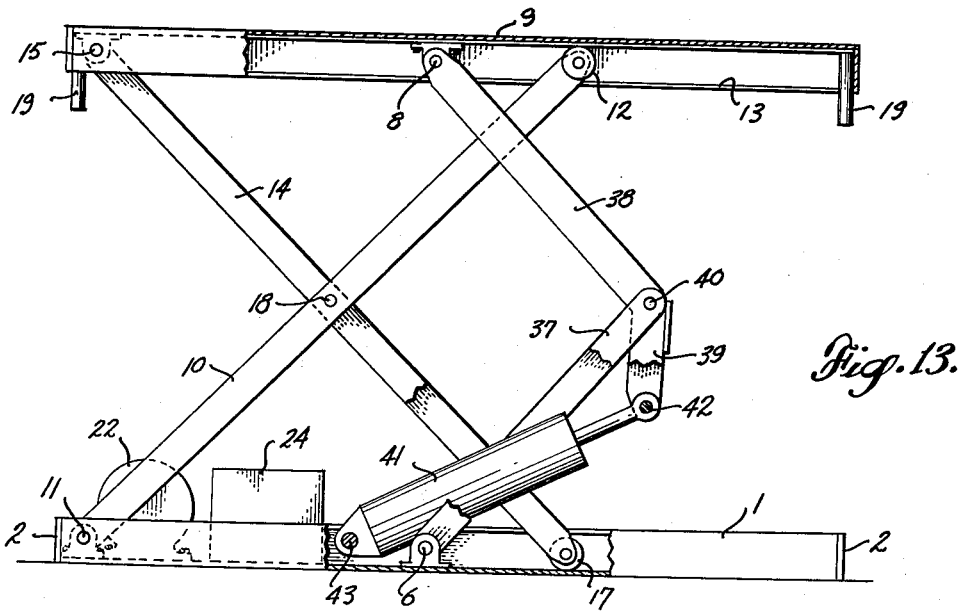
FIGURE 13 is a side elevation view of another modification of the table in an upper position of adjustment, with parts broken away.
Figure 14:
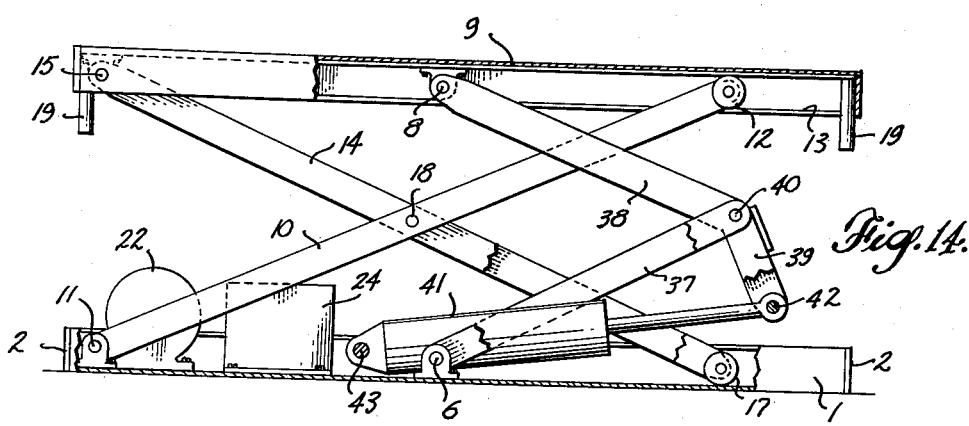
FIGURE 14 is a similar view with the table in an intermediate position of adjustment.
Figure 15:
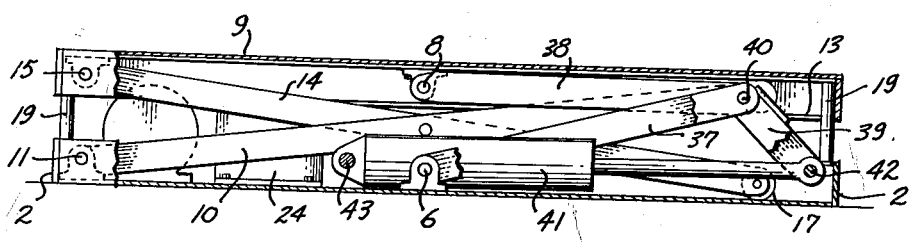
FIGURE 15 is a similar view with the table in its lowermost position.

In the two forms of adjustable elevation table described above, the actuator in each instance is of the pusher type. In FIGURES 13, 14 and 15, on the other hand, an adjustable elevation table structure is shown which in most respects is similar to the construction of the table shown in FIGURES 1 to 5, inclusive, but in this instance the actuator for effecting height adjustment of the table is of the pulling type. The table base, top and stabilizing linkage interengaged between them are the same as in the table shown in FIGURES 1 to 5, and the parts are numbered correspondingly. The thrust linkage connected between the base pivot 6 and the top pivot 8, however, is different.

In the table of FIGURES 13 to 15, inclusive, the lower link 37 of the thrust linkage is straight as is the lower link of the thrust linkage shown in the table of FIGURES 1 to 5, inclusive. Also, correspondingly, the upper link of the thrust linkage shown in FIGURES 13 to 15, inclusive, is bent and includes an upper long leg 38 and a lower short leg 39. Moreover, the links 37 and 38, 39 in this instance as in FIGURES 1 to 5, inclusive, are constructed as leaves or frames so as to have reasonable torsional rigidity. The lower end of the lower link 37 is connected to the base of the table by pivot 6 and the upper end of the upper link is connected to the top of the table by pivot 8.

The thrust linkage of the table shown in FIGURES 13, 14 and 15 differs from that of the thrust linkage shown in FIGURES 1 to 5, inclusive, in two principal respects and one minor respect. The upper end of the lower link 37 is connected to the upper link by pivot 40 which is located at the bend of the upper link instead of at the lower end of the upper link. Second, the actuator 41 which may be of the hydraulic piston-and-cylinder type is constructed to exert a pulling action rather than a pushing action like the actuator 20 of FIGURES 1 to 5. Third, the actuator 41 is connected by pivot 42 to the lower end of the upper link instead of being connected to the bent portion of such link and its opposite end is connected by pivot 43 to the base, although under some circumstances such lower end could alternatively be connected to the link 37.

With the actuator arrangement shown in FIGURES 13, 14 and 15, extension of the thrust linkage from the folded position shown in FIGURE 15 through the intermediate position shown in FIGURE 14 to the extended position shown in FIGURE 13 is accomplished by contracting movement of the actuator 41. When the table is in its collapsed position of FIGURE 15, the thrust line of the actuator 41 is virtually parallel to a line joining pivots 8 and 40 of the upper link. The lever arm on which the actuator acts is a line perpendicular to the line joining the pivots 42 and 43 and extending through the pivot 40. Because the actuator thrust line is substantially parallel to the line joining pivots 8 and 40 with the parts in the position shown in FIGURE 15, the action of the actuator is most effective in that condition. At the same time, the separation movement of pivots 6 and 8 is greatest for a given angular movement of the upper and lower links when the parts are in the position shown in FIGURE 15 so it is desirable for the thrust action of the actuator to be most effective under those circumstances.

As the thrust linkage unfolds to the position of FIGURE 14, the moment produced by the actuator 41 varies with the angle between the line joining pivots 8 and 40 and the line joining pivots 42 and 43. Consequently, the moment increases progressively as the thrust linkage opens from the position of FIGURE 15 through the position of FIGURE 14 and then decreases as the linkage approaches the position of FIGURE 13. At the same time, however, the separating movement of pivots 6 and 8 for a given relative angular movement of the links of the thrust linkage is decreasing so that it is not necessary to have as great an operating force applied to the linkage in its open or expanded condition.

It will be evident that the angle of bend between the link legs 38 and 39 and the position of pivot 43 is important. If the angle between legs 38 and 39 were smaller, pivot 42 would be farther to the left in the unfolded position of the linkage shown in FIGURE 13. Also, if pivot 43 were located farther to the right, the effectiveness of the actuator would be decreased. Such shifting of pivot 42 to the left or of pivot 43 to the right would increase the angle between the line joining pivots 8 and 40 and the line joining pivots 42 and 43 which correspondingly decreases the sine of the angle between these lines and, consequently, the effectiveness of the actuator. Such alteration of the location of these pivots also would reduce the overall length of the actuator and it would not be possible to reduce the stroke of the actuator very much and still obtain the range of table elevation adjustment which can be effected by the mechanism shown in FIGURES 13, 14 and 15.

The mechanism for effecting and controlling the operation of the actuator 41 shown in FIGURES 13, 14 and 14 can be comparable to that described in connection with FIGURES 1 to 5, inclusive, except that hydraulic fluid would be supplied to the piston rod end of the cylinder in the actuator 41 to unfold the thrust linkage instead of being supplied to the opposite end of the cylinder as in the case of the actuator 20 shown in FIGURES 1 to 5, inclusive. The action of the stabilizing linkage will be the same, of course, as in the device shown in FIGURES 1 to 5 so that it is unnecessary to described such operation again.

I claim as my invention:

1. A table adjustable in height comprising a base, a table top, thrust linkage, first pivot means having its axis located centrally between opposite edges of said table top and connecting said thrust linkage to said table top, said thrust linkage being engaged with a portion of said base directly beneath said first pivot means, said thrust linkage including an upper link, a lower link, one of said links being bent, and second pivot means interconnecting said upper link and said lower link, actuator means pivotally connected to said bent link at only one location which location is spaced lengthwise of said bent link from said second pivot means, said actuator means being operable to effect relative swinging of said links between a folded position supporting said table top in a lowered position and an unfolded position supporting said table top in a raised position substantially parallel to such lowered position, and stabilizing means interengaged between said base and spaced portions of said table top located at opposite sides of said first pivot means and operable to maintain said first pivot means in superposed registry with the portion of said base engaged by said thrust linkage and to restrain tilting of said table top relative to said base.

2. The table defined in claim 1, in which the second pivot means interconnects the upper link and the lower link at a location spaced from the bend of the bent link and the actuator means is pivotally connected to the bent link adjacent to its bend and is variable in effective length to produce a pushing force on its pivot connection to the bent link for effecting relative swinging of the links toward unfolded relationship.

3. The table defined in claim 1, in which the second pivot means interconnects the upper link and the lower link at a location adjacent to the bend of the bent link and the pivot connection between the actuator means and the bent link is located at the side of the second pivot means remote from the first pivot means, the actuator means being variable in effective length to exert a pulling force on the pivot connection of the actuator means to the bent link for effecting relative swinging of the links toward unfolded position.

References Cited in the file of this patent

UNITED STATES PATENTS

| 2,373,848 | Owens | Apr. 17, 1945 |
| 2,698,199 | Godberson | Dec. 28, 1954 |
| 2,928,558 | Bamford et al. | Mar. 15, 1960 |

FOREIGN PATENTS

| 657,637 | France | Jan. 16, 1929 |